United States Patent Office 2,713,573
Patented July 19, 1955

2,713,573
COPOLYMERS OF ACRYLONITRILE AND N-LACTAMS

Calvin E. Schildknecht, Montclair, and Mary L. Wallace, Summit, N. J., assignors to Celanese Corporation of America, New York, N. Y., a corporation of Delaware No Drawing. Application November 1, 1952,
Serial No. 318,329

12 Claims. (Cl. 260—85.5)

This invention relates to polymers and relates more particularly to an improved process for the production of copolymers of acrylonitrile and N-vinyl lactams.

Polyacrylonitrile possesses a number of valuable properties, such as a high melting point, that renders it eminently suited for the production of textile materials such as filaments, yarns and the like. However, there are a number of difficulties involved in spinning this polymer because it is insoluble in common, inexpensive solvents. In addition, this polymer has a poor affinity for the conventional types of dyestuffs so that special dyestuffs or dyeing techniques must be employed for the dyeing of textile materials prepared therefrom. Moreover, conventional methods of polymerization has given yellow or brownish colored polymers.

It has previously been suggested that polymers possessing the desirable properties of polyacrylonitrile and having an improved solubility in common, inexpensive solvents, an improved affinity for dyestuffs and a better color could be prepared by copolymerizing acrylonitrile with other polymerizable materials. One such class of copolymers having outstanding properties is that prepared by copolymerizing acrylonitrile with N-vinyl lactams, such as, for example, N-vinyl caprolactam, N-vinyl-alpha piperidone and N-vinyl alpha pyrrolidone. When these copolymers are prepared in the manner previously suggested for the polymerization of acrylonitrile it is found that the N-vinyl lactam tends to hydrolize or otherwise decompose to produce aldehydes or other impurities. As a result, the yield of copolymer is reduced and, moreover, the product obtained is quite heterogeneous, exhibiting a wide distribution of molecular weights and lowered softening and melting points. On dissolving such a copolymer, it is found that while a portion thereof will show a good solubility other portions thereof will exhibit a poor solubility and may even be insoluble. The impurities produced by the hydrolysis or decomposition of the N-vinyl lactams will be occluded in the product and tend to lower the melting point and impair the properties thereof. The impurities also tend to slow down and may even stop the polymerization.

It is an important object of this invention to provide a process for the production of copolymers of acrylonitrile and N-vinyl lactams that will be free from the foregoing and other difficulties and that will be especially efficient in operation.

A further object of this invention is to provide a process for the production of coplymers of acrylonitrile and N-vinyl lactams in which little or no hydrolysis of the monomers will take place during the polymerization.

Other objects of this invention will be apparent from the following detailed description and claims.

According to the present invention, a coplymer of acrylonitrile and an N-vinyl lactam is prepared in an aqueous medium containing a persulfate polymerization catalyst and, as an accelerator, a reducible sulfur compound, which medium has a pH of between about 5 and 8 and in which medium there is dissolved carbon dioxide. When the polymerization is carried out in this manner it is found that there is little or no tendency for the N-vinyl lactam to hydrolyze or otherwise decompose. The copolymer obtained in accordance with this process is relatively homogeneous and free from occluded impurities. Another advantage of this process is that the product is formed directly as an easily filterable precipitate.

The persulfate polymerization catalysts suitable for carrying out the process of the present invention include, for example, ammonium persulfate and the alkali metal persulfates such as sodium and potassium persulfate. The catalyst is preferably employed in concentrations ranging from about 0.5% to 5.0% based on the total weight of the monomers. The reducible sulfur compounds that are suitable as accelerators in carrying out the process of this invention contain an $S=O$ group and include, for example, sodium bisulfite, sodium metabisulfite, sulfur, dioxide, acetone sodium bisulfite, sulfoxides and formaldehyde sodium sulfoxylate. The accelerator is preferably employed in concentrations ranging from about 0.25% to 4.0% by weight based on the total weight of the monomers. The polymerization medium is buffered to a pH of between about 5 and 8 by the addition, for example, of suitable quantities of $Na_2HPO_4$, $NaH_2PO_4$, $KH_2PO_4$, $Na_2B_4O_7$ or potassium acid phthalate. Control of the pH within this range is most important since a lower pH will tend to hydrolyze or decompose the N-vinyl lactams while a higher pH will prevent any appreciable polymerization from taking place.

The aqueous medium in which the polymerization is carried out has dissolved therein carbon dioxide. Preferably the said medium is saturated with carbon dioxide, for example, by bubbling a stream of carbon dioxide through said medium or by introducing solid carbon dioxide into said medium. The carbon dioxide serves to exclude oxygen which has a tendency to slow down or stop the polymerization. More important, the carbon dioxide assists in maintaining the pH of the polymerization medium within the proper range. As the polymerization proceeds, the polymerization medium may tend to become more acid from reaction of the persulfate. Simultaneously, however, carbon dioxide will escape from the polymerization medium as the result of agitation and, possibly a rise in temperature, so that said medium will tend to become more alkaline. These two tendencies will balance one another so that the pH of the polymerization medium will tend to remain within the preferred range. Polymerization in the presence of dissolved carbon dioxide also gives a polymer of higher intrinsic viscosity and of better color than when other inert gases, such as nitrogen, are employed to exclude oxygen.

In carrying out the polymerization according to the process of the present invention, the concentration of both monomers dispersed together may range from about 50 to 200 grams per liter of water. Lower concentrations are uneconomical in that they require the handling of large volumes of material, whereas higher concentrations are impractical in that it is difficult to handle the thick slurries that are formed. The polymerization is best carried out at temperatures of between about 20 and 60° C. and will normally be completed in between about ½ and 6 hours. Higher polymerization temperatures are undesirable in that they lead to discoloration and cross-linking which impairs the solubility of the polymer. To improve the homogeneity of the polymer further, the N-vinyl lactam may be added to the polymerization medium stepwise as the polymerization proceeds.

An improvement in the speed of the polymerization may be effected by having present during the polymerization a tertiary amine compound such as, for example, N-methyl morpholine, dimethylethanolamine, diethylethanolamine, triethanolamine or cetyl dimethylamine sulfate. The tertiary amine may be employed in amounts ranging from about 0.05 to 2.0 percent by weight based on the weight of the monomers. There may also be present during the polymerization from about 0.1 to 5.0 percent by weight based on the weight of the monomers, of a water-soluble chain transfer agent such as lauryl mercaptan, allyl alcohol, methallyl alcohol or dioxane. The polymers produced in the presence of a chain transfer agent show an improved solubility, possibly owing to the action of the chain transfer agent in preventing branching of the polymer chain.

The proportions of acrylonitrile in the monomer mixture will depend upon the properties that it is desired to obtain in the final products and may range from as little as about 70 mole percent to as high as about 99 mole percent. The polymers having a high percentage of acrylonitrile are suitable for the production of textile materials such as filaments, yarns and the like, as well as for the production of films. Those having a low percentage of acrylonitrile are suitable for use as adhesives, coating compositions and in related applications. In addition to the acrylonitrile and N-vinyl lactam there may also be present other polymerizable compounds. Particularly good polymers may be obtained by having present a small proportion, of up to about 10 mole percent, of an olefinic compound which does not itself polymerize under the conditions employed to give a polymer of high molecular weight. Examples of such compounds include methallyl alcohol, vinyl isobutyl ether, isobutylene, isopropenyl acetate and diethyl fumarate.

The following examples are given to illustrate this invention further.

*Example I*

There are mixed together at a temperature of 26° C., 95.0 parts by weight of acrylonitrile, 5.0 parts by weight of vinylpyrrolidone, 3.0 parts by weight of potassium persulfate, 2.0 parts by weight of sodium monoacid phosphate ($Na_2HPO_4.12H_2O$) and 1500 parts by weight of water. The polymerization medium is saturated with water. The polymerization medium is saturated with carbon dioxide gas by the introduction of an excess of solid carbon dioxide, following which there is added 1.5 parts by weight of sodium metabisulfite. The pH of the polymerization medium is 5.5. Polymerization is continued for 2 hours with agitation during which time the temperature rises to 36° C. and the pH changes to 5.4. The polymer produced is filtered from the polymerization medium, washed with water and dried. There is obtained a yield of 69 parts by weight or 69% of theory of a polymer having an acrylonitrile content of 93.3 mole percent as determined by nitrogen analysis. The polymer has a tack point, when heated as a powder on a melting point block, of 168° C. as compared with a tack point of 180° C. for polyacrylonitrile. The intrinsic viscosity of the polymer is 3.8 when measured using 0.1 gram per 100 milliliters solution in dimethylformamide.

The polymer obtained is soluble in butyrolactone and may be employed for the production of filaments and films.

*Example II*

There are mixed together at a temperature of 28° C., 95.0 parts by weight of acrylonitrile, 5.0 parts by weight of vinylpyrrolidone, 3.0 parts by weight of potassium persulfate, 2.0 parts by weight of sodium monoacid phosphate hydrate and 1500 parts by weight of water. The polymerization medium is treated with carbon dioxide gas but insufficient for saturation, following which there is added 1.5 parts by weight of sodium metabisulfite. The pH of the polymerization medium is 8.0. Polymerization is continued for 2 hours with agitation during which time the temperature rises to 37° C. and the pH changes to 7.7. The polymer produced is filtered from the polymerization medium, washed with water and dried. There is obtained a yield of 54 parts by weight or 54% of theory of a polymer having an acrylonitrile content of 93.8 mole percent as determined by nitrogen analysis. The polymer has a tack point of 168° C. and an intrinsic viscosity of 3.4 when measured using 0.10 gram per 100 milliliters solution in dimethyl formamide.

The polymer obtained is substantially soluble in butyrolactone and may be employed for the production of filaments and films.

*Example III*

There are mixed together at a temperature of 31° C., 95 parts by weight of acrylonitrile, 5 parts by weight of vinylpyrrolidone, 4.5 parts by weight of potassium persulfate, 2 parts by weight of sodium monoacid phosphate hydrate, 3.7 parts by weight of lauryl mercaptan and 1500 parts by weight of water. The polymerization medium is saturated with carbon dioxide, following which there is added 3.5 parts by weight of sodium metabisulfite. The pH of the polymerization medium is 5.5. Polymerization is continued for 2.5 hours during which time the temperature rises to 41° C. and the pH changes to 5.7. The polymer produced is filtered from the polymerization medium, washed and dried. There is obtained a yield of 73 parts by weight or 73% of theory of a polymer having an acrylonitrile content of 94 mole percent as determined by nitrogen analysis. The polymer has a tack point of 167° C. and an intrinsic viscosity of 2.2 when measured using 0.10 gram per 100 milliliters solution in dimethylformamide.

The polymer obtained is soluble in butyrolactone and may be employed for the production of filaments and films.

*Example IV*

There are mixed together at a temperature of 31° C., 98 parts by weight of acrylonitrile, 2 parts by weight of vinylpyrrolidone, 4.5 parts by weight of potassium persulfate, 2.0 parts by weight of disodium hydrogen phosphate hydrate, and 1500 parts by weight of water. Several pieces of solid carbon dioxide are added to the mixture, but insufficient to produce saturation with carbon dioxide. There is then added 1.6 parts by weight of N-methyl morpholine and 3.5 parts by weight of sodium metabisulfite ($Na_2S_2O_5$). Polymerization is continued for 2 hours during which time the highest temperature reached is 46° C. After removing the white solid polymer the filtrate shows a pH of 6.5. The polymer is washed with water, then with methanol and dried at 60° C. The yield of acrylonitrile-vinyl lactam copolymer is 86% and the intrinsic viscosity in solution in dimethyl formamide is 4.5.

The copolymer dissolves in propylene carbonate at 130° C. in contrast to unmodified acrylonitrile homopolymers which do not dissolve even at this temperature.

*Example V*

There are mixed together at 38° C., in a reactor provided with a motor-driven agitator, 93 parts by weight of acrylonitrile, 5 parts by weight of vinylpyrrolidone, 2 parts by weight of methallyl alcohol, 4.5 parts by weight potassium persulfate, 2.0 parts by weight of $Na_2HPO_4.12H_2O$, and 1500 parts by weight of distilled water. Through the clear solution carbon dioxide is bubbled for 5 minutes and then there is added 4.0 parts by weight of sodium metabisulfite. The initial pH of the polymerization medium is 5.7. Copolymerization continues for 5 hours during which the temperature is maintained between 38° C. and 46.5° C. The white copolymer is filtered from the polymerization medium (pH 5.9), washed three times with water, then with methanol and dried. There is obtained a polymer yield of 65 parts by weight having an acrylonitrile content of 92.5 mole percent as determined by nitrogen analysis. The copolymer has a tacky point of 170° C. and an intrinsic viscosity of 1.91 when measured using 0.10 gram dissolved polymer in 100 milliliters dimethyl formamide solution.

This tripolymer has good solubility considering its high acrylonitrile content. It dissolves in gamma-butyrolactone at 25° C. and also in warm propylene carbonate to give clear, colorless solutions.

It is to be understood that the foregoing detailed description is given merely by way of illustration and that many variations may be made therein without departing from the spirit of our invention.

Having described our invention what we desire to secure by Letters Patent is:

1. In a process for the production of copolymers of acrylonitrile and N-vinyl lactams, the improvement which comprises carrying out the polymerization in an aqueous medium containing a persulfate polymerization catalyst, and a reducible sulfur compound having an S=O group as an accelerator, said medium being buffered to a pH of between about 5 and 8 and having carbon dioxide dissolved therein.

2. In a process for the production of copolymers of acrylonitrile and N-vinyl lactams, the improvement which comprises carrying out the polymerization in an aqueous medium containing between about 0.5 and 5.0% by weight based on the weight of the monomers of a persulfate polymerization catalyst, and between about 0.25 and 4.0% by weight based on the weight of the monomers of a reducible sulfur compound having an S=O group as an accelerator, said medium being buffered to a pH of between about 5 and 8 and having carbon dioxide dissolved therein.

3. In a process for the production of copolymers of acrylonitrile and N-vinyl lactams, the improvement which comprises carrying out the polymerization in an aqueous medium containing a persulfate polymerization catalyst, a reducible sulfur compound having an S=O group as an accelerator, and a chain transfer agent, said medium being buffered to a pH of between about 5 and 8 and having carbon dioxide dissolved therein.

4. In a process for the production of copolymers of acrylonitrile and N-vinyl lactams, the improvement which comprises carrying out the polymerization in an aqueous medium containing a persulfate polymerization catalyst, a reducible sulfur compound having an S=O group as an accelerator, and a tertiary amine, said medium being buffered to a pH of between about 5 and 8 and having carbon dioxide dissolved therein.

5. In a process for the production of copolymers of acrylonitrile and N-vinyl lactams, the improvement which comprises carrying out the polymerization in an aqueous medium containing a persulfate polymerization catalyst, and a reducible sulfur compound having an S=O group as an accelerator, said medium being buffered to a pH of between about 5 and 8 and being saturated with carbon dioxide.

6. In a process for the production of copolymers of acrylonitrile and N-vinyl lactams, the improvement which comprises carrying out the polymerization in an aqueous medium containing between about 0.5 and 5.0% by weight based on the weight of the monomers of a persulfate polymerization catalyst, and between about 0.25 and 4.0% by weight based on the weight of the monomers of a reducible sulfur compound having an S=O group as an accelerator, said medium being buffered to a pH of between about 5 and 8 and being saturated with carbon dioxide.

7. In a process for the production of copolymers of acrylonitrile and N-vinyl lactams, the improvement which comprises carrying out the polymerization in an aqueous medium containing between about 0.5 and 5.0% by weight based on the weight of the monomers of a persulfate polymerization catalyst, between about 0.25 and 4.0% by weight based on the weight of the monomers of a reducible sulfur compound having an S=O group as an accelerator and between about 0.1 and 5% by weight based on the weight of the monomers of a water-soluble chain transfer agent, said medium being buffered to a pH of between about 5 and 8 and being saturated with carbon dioxide.

8. In a process for the production of copolymers of acrylonitrile and N-vinyl lactams, the improvement which comprises carrying out the polymerization in an aqueous medium containing between about 0.5 and 5.0% by weight based on the weight of the monomers of a persulfate polymerization catalyst, between about 0.25 and 4.0% by weight based on the weight of the monomers of a reducible sulfur compound having an S=O group as an accelerator, between about 0.1 and 5.0% by weight based on the weight of the monomers of a chain transfer agent and between about .05 and 2.0% by weight based on the weight of the monomers of a tertiary amine, said medium being buffered to a pH of between about 5 and 8 and being saturated with carbon dioxide.

9. In a process for the production of copolymers of acrylonitrile and N-vinyl lactams, the improvement which comprises carrying out the polymerization at a temperature of between about 20 and 60° C. for a period of between about ½ and 6 hours in an aqueous medium containing between about 0.5 and 5.0% by weight based on the weight of the monomers of a persulfate polymerization catalyst, between about 0.25 and 4.0% by weight based on the weight of the monomers of a reducible sulfur compound having an S=O group as an accelerator, between about 0.1 and 5.0% by weight based on the weight of the monomers of a chain transfer agent and between about .05 and 2.0% by weight based on the weight of the monomers of a tertiary amine, said medium being buffered to a pH of between about 5 and 8 and being saturated with carbon dioxide and containing between about 50 and 200 grams per liter of monomers.

10. In a process for the production of copolymers of acrylonitrile and N-vinylpyrrolidone, the improvement which comprises carrying out the polymerization in an aqueous medium containing a persulfate polymerization catalyst, and a reducible sulfur compound having an S=O group as an accelerator, said medium being buffered to a pH of between about 5 and 8, and having carbon dioxide dissolved therein.

11. In a process for the production of copolymers of acrylonitrile and N-vinylpyrrolidone, the improvement which comprises carrying out the polymerization in an aqueous medium containing between about 0.5 and 5.0% by weight based on the weight of the monomers of a persulfate polymerization catalyst, and between about 0.25 and 4.0% by weight based on the weight of the monomers of a reducible sulfur compound having an S=O group as an accelerator, said medium being buffered to a pH of between about 5 and 8, and having carbon dioxide dissolved therein.

12. In a process for the production of copolymers of acrylonitrile and N-vinylpyrrolidone, the improvement which comprises carrying out the polymerization at a temperature of between about 20 and 60° C. for a period of between about ½ and 6 hours in an aqueous medium containing between about 0.5 and 5.0% by weight based on the weight of the monomers of a persulfate polymerization catalyst, between about 0.25 and 4.0% by weight based on the weight of the monomers of a reducible sulfur compound having an S=O group as an accelerator, between about 0.1 and 5.0% by weight based on the weight of the monomers of a chain transfer agent and between about .05 and 2.0% by weight based on the weight of the monomers of a tertiary amine, said medium being buffered to a pH of between about 5 and 8 and being saturated with carbon dioxide and containing between about 50 and 200 grams per liter of monomers.

References Cited in the file of this patent

UNITED STATES PATENTS

| 2,436,926 | Jacobson | Mar. 2, 1948 |

FOREIGN PATENTS

| 500,644 | Belgium | July 16, 1951 |